(12) United States Patent
Cimorell et al.

(10) Patent No.: US 6,612,046 B1
(45) Date of Patent: Sep. 2, 2003

(54) MARKING DEVICE

(75) Inventors: Bret J. Cimorell, Ashtabula, OH (US); Jon J. Love, Ashtabula, OH (US); Louis J. Seitz, Findlay, OH (US)

(73) Assignee: NCI Engineering Technologies, LTD, Ashtabula, OH (US)

( * ) Notice: Subject to any disclaimer, the term of this patent is extended or adjusted under 35 U.S.C. 154(b) by 0 days.

(21) Appl. No.: 09/878,609

(22) Filed: Jun. 11, 2001

(51) Int. Cl.[7] .............................. G01B 3/10; B25H 7/04
(52) U.S. Cl. .............................. 33/668; 33/760; 33/770; 33/761
(58) Field of Search .................... 33/755, 759, 760, 33/668, 761, 768, 770, 42, 34, 35, 36, 37, 38, 39.1, 39.2

(56) References Cited

U.S. PATENT DOCUMENTS

| | | | |
|---|---|---|---|
| 4,233,749 A | * 11/1980 | Coulter et al. | ................. 33/668 |
| 4,439,927 A | 4/1984 | Elliot | |
| 4,542,589 A | * 9/1985 | Yamamoto | ................... 33/760 |
| 4,651,429 A | 3/1987 | Ljungberg | |
| 4,965,941 A | 10/1990 | Agostinacci | |
| 5,416,978 A | 5/1995 | Kaufman | |
| 5,435,074 A | * 7/1995 | Holevas et al. | ................ 33/668 |
| 5,768,992 A | 6/1998 | Daw et al. | |
| 5,815,939 A | 10/1998 | Ruffer | |

* cited by examiner

Primary Examiner—Diego Gutierrez
Assistant Examiner—Travis Reis
(74) Attorney, Agent, or Firm—Robert R. Hussey Co. LPA

(57) ABSTRACT

A marking device is used with a measuring tape extendable from a coiled position to mark a desired distance measured by the tape. The marking device includes an actuation member and a marker holder. The actuation member has an exterior portion for manual movement from a retracted to a marking position which moves the marker holder from the retracted to the marking position. A marker is attached to the marker holder for marking the desired distance. A guide device is provided to guide the marker across an inker and then to the marking position. A biasing device, such as a spring, is connected to the marker holder to urge the marker holder towards the retracted position.

27 Claims, 6 Drawing Sheets

MARKING DEVICE

BACKGROUND OF THE INVENTION

The present invention relates generally to a marking device and particularly to marking devices for use with measuring tape to mark a desired distance measured by the measuring tape.

Measuring tapes are used in a variety of environments for measuring material such as in the construction industry, distances in a floor layout, the manufacture various products and in the household. Once the tape measures a desired distance, a mark is placed on the material measured to establish the distance measured. It is important to make sure that the mark indicates the desired distance. If the mark is made with a pencil, considerable time is spent making sure that the point of the pencil is placed at exactly the measured distance. If the person making the mark is at an angle with respect to the material being marked or the tape is spaced above the surface of the material to be marked, a parallax problem can create inaccurate placing of the mark. When that mark is then used to cut or otherwise shape the material, that cut or shaping of the material is inaccurate and may not be usable.

Known tape measures typically have a flexible measuring tape resiliently coiled within a housing. The tape is normally printed with measuring marks for measuring distances.

Various devices have been developed for incorporating a marker for use with a coiled flexible measuring tape. Agostinacci, U.S. Pat. No. 4,965,941, discloses a combination marker and tape measure. The marker is manually movable to a marking position and is biased toward a retracted position by a spring. The flexible measuring tape is biased toward its coiled position with a separate spring device. The marker has an integral liquid reservoir for supplying ink for making the mark.

Another marking device and is disclosed in Kaufman, U.S. Pat. No. 5,416,978, and provides a marker device which is actuated to make a mark or a series of marks by lugs formed on the measuring tape. Other tape measuring devices are provided by Elliott, U.S. Pat. No. 4,439,927, Ruffer, U.S. Pat. No. 5,815,939, and Ljungberg, U.S. Pat. No. 4,651,429.

It is desirable to provide a marking device that accurately places a mark on a workpiece, particularly by avoiding a parallax problem with the operator of the marking device. If the person making the mark is at an angle with respect to the material being marked or the tape is spaced from the surface of the material to be marked, a parallax problem can create inaccurate placing of a mark.

It is also desirable to provide a marking device having a simplified design which utilizes the spring urging the tape to the coiled position to also urge the marker from the marking position to the retracted position. A simplified design also allows for easily made components which are assembled to provide a marking device.

It is also desirable to be able to accurately mark the same distance a number of times. For example, when cutting a piece of lumber occasionally the same distance must be marked from an edge a series of times so that a straight line can be cut. If those marks are not the same distance, a straight line will not be cut and the material will not be usable.

It is also desirable to be able to make a series of accurate marks in a minimum amount of time. By increasing the speed of making accurate marks, the labor costs are decreased and layout times are reduced. Increased speed also results from a marker being readily available. For example, if a marker, such as a pencil, is used, frequently the pencil cannot be found and valuable time is spent looking for it. It is also desirable to provide a marking device that can be actuated with the same hand as that holding the tape.

Another desirable feature is to provide a marking device that can be mounted on existing measuring tapes. It is also desirable to provide a marking device that is simple in construction to reduce the complexity and cost of manufacturing. It is also desirable to provide a marking device that is compact and light in weight.

SUMMARY OF THE PRESENT INVENTION

The present invention provides the above described desirable features with improved marking device for use with a measuring tape to mark a desired distance measured by the tape.

The present invention provides a marking device for use with a measuring tape extendable from a coiled position to mark a desired distance measured by the tape which includes a housing having an outer surface with an actuation aperture and a marking aperture therethrough. An actuation member is provided having an exterior portion extending through the actuation aperture and outwardly therefrom. The actuation member is movably mounted to the housing in a slot and is movable between a retracted position and the marking position. A slot is provided in the actuation member to receive a pin attached to the housing for guiding the movement of the actuation member between the retracted and the marking position. A marker holder is also provided with a marker attached thereto.

The measuring tape has measuring marks printed thereon for measuring distances and is resiliently coiled around a rotational axis about which the tape is coiled. To measure a distance, the flexible tape is partially uncoiled and extended a sufficient amount to indicate the distance measured. That distance can then be marked with the marker, on the material to be marked positioned directly under marker.

The marker holder and its marker are movable from a retracted position to a marking position by activation of the actuation member. When in the marking position, the marker extends through the marking aperture to place a mark on the surface of a workpiece. The marking aperture is in alignment with the desired measuring mark on the measuring tape so that when the actuation member is activated a mark is accurately made on the surface of a workpiece.

The marking device has a guide device to guide the marker holder upon movement of the marker between the retracted in marking positions. The guide device includes cooperating slots and pins that guide the marker from the retracted position and the marking position. The marking device has an inker for providing ink to the marker would when a marker is moved from the retracted position to the marking position.

When the marker is in the retracted position, the marker is adjacent the inker. As the marker is moved from the retracted position to the marking position, it is guided across the inker to supply ink to the marker. After picking up ink from the inker, the marker moves in a vertical direction through the marker aperture to mark the distance measured. To guide such movement of the marker, the guide device includes a pair of spaced pins secured to the marker holder which are received by a pair of slots in the marking device housing. The slot receiving the pin closest to the marker is configured to guide the marker across the inker as it is moved from the retracted to the marking position and then in a vertical direction to make a mark on the workpiece.

The marking device and present invention also provides a biasing device connected to the marker holder to urge the marker holder towards the retracted position. When the actuation member is manually depressed, the force exerted thereon overcomes the biasing force of the biasing device and moves the marker from the retracted to the marking position. When the actuation member is deactivated or released, the force of the biasing device moves the marker holder and the actuation member back to the retracted position.

The biasing device of the present invention includes a biasing arm and a spring connected to the biasing arm. The biasing arm is connected to the marker holder to urge the marker holder towards the retracted position. The spring is also connected to the measuring tape to urge the tape to the coiled position while allowing movement of the tape to an extended position in which the measure markings can be viewed. The spring is wound around its rotational axis and is adapted to urge the tape to its coiled position around the same rotational axis.

Other desirable features and advantages of the present invention will become apparent from a study of the following description and the accompanying drawings which are illustrative of the invention.

DETAILED DESCRIPTION OF THE INVENTION

Figure 1:
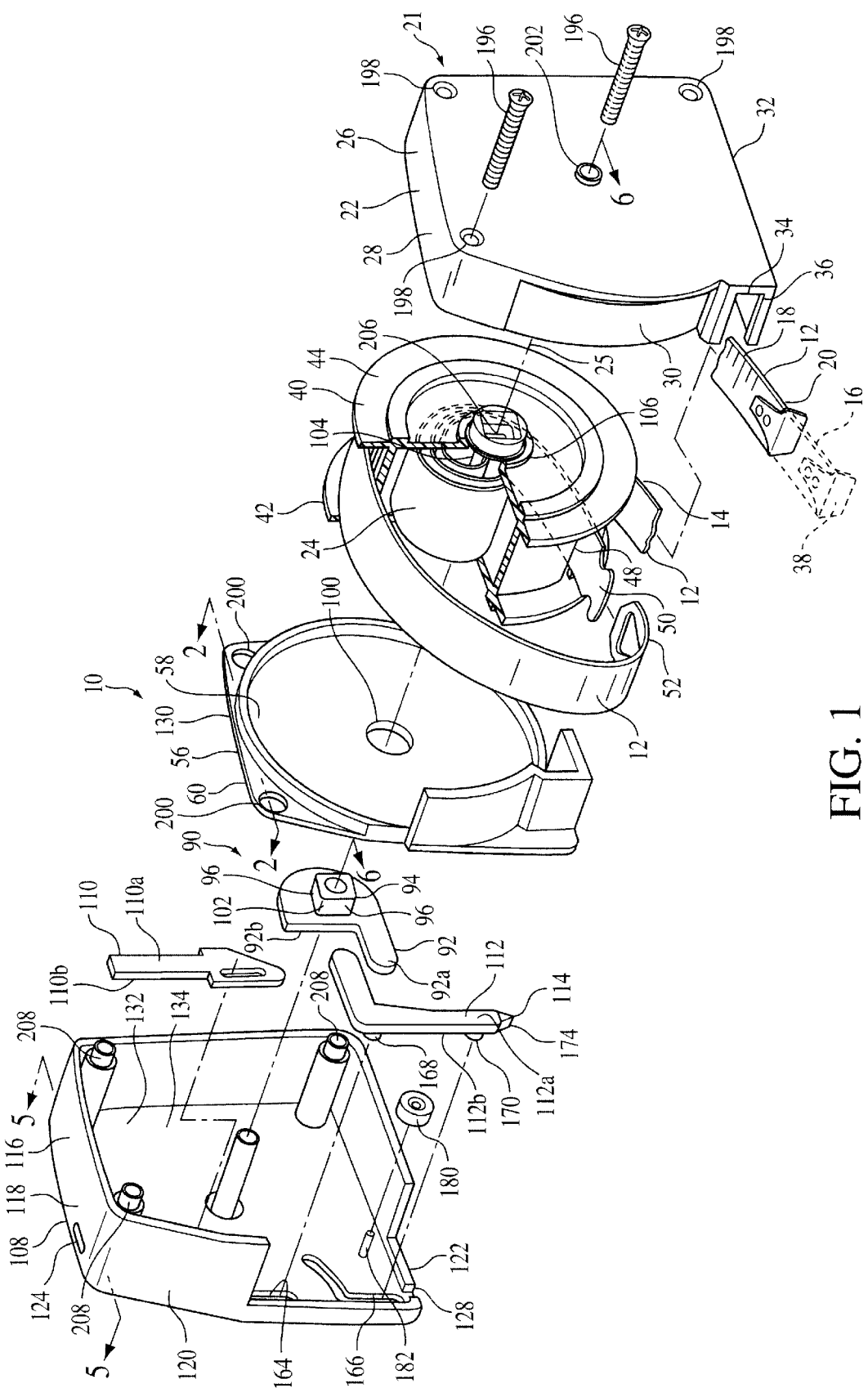
FIG. 1 is an exploded perspective view of the marking device of the present invention.

The present invention provides a marking device with the above described desirable features that may be implemented in a variety of designs for use with a measuring tape extendable from a coiled position to mark a desired distance measured by the tape. For ease of description, the invention will be described in connection with the marking device 10 shown in FIG. 1 and it should be understood that the advantageous features of the present invention may be used in connection with a variety of marking devices.

The marking device 10 of the present invention, shown in FIGS. 1–5, is used with a flexible measuring tape 12 extendable from a coiled position 14 to an extended position, indicated at 16, to mark a desired distance measured by the tape. There are a wide variety of known constructions and designs of flexible measuring tapes that are extendable from a coiled position 14 to an extended position 16. The flexible measuring tape 12 described below is provided for purposes of illustration and it should be understood that it is fully within the contemplation of this invention to use the marking device 10 with a variety of measuring tapes of other known constructions and designs.

The measuring tape 12 is printed with measuring marks 18 thereon for measuring distances. To measure a distance, the flexible tape 12 is uncoiled and extended to indicate the distance measured. The measuring tape 12 is mounted in a housing 21 having a tape housing member 22, as will be herein described in more detail. The tape 12 is biased towards a coiled position 14 by a spring 24. The measuring tape 12 is resiliently coiled around a rotational axis 25 as will be hereinafter more fully described. The tape housing member 22 has an outer peripheral surface 26, defined in part by top, side, and bottom peripheral surfaces 28, 30 and 32, respectively. The tape housing member 22 has a measuring tape opening or aperture 34 in the side peripheral surface 30 terminating in the outer edge 36.

To measure a desired distance, the end 38 of the measuring tape 12 is partially uncoiled and extended as illustrated by the dashed lines in FIG. 1, until the end 38 is positioned on the edge of a workpiece and the desired mark 18 is in alignment with the outer edge 36 of the housing member 22. That distance can then be marked with a marker device 10 of the present invention, on the workpiece positioned directly under the bottom surface 20 of the measuring tape 12 in the bottom peripheral surface 32 of the housing member 22. The tape 12 may then be returned by the spring 24 to the coiled position 14 in which the end 38 is in contact with the housing 21 adjacent the tape opening 34.

As shown in FIGS. 1 and 6–8, the spring 24 biases the tape 12 towards a coiled position 14. As described above, the tape 12 is resiliently coiled around the axis 25. A coiling drum 40 is provided for so coiling the spring 24 and the tape 12. The coiling drum 40 has a pair of opposed side walls 42, 44 within an intermediate drum portion 46 connecting the inner sides 42a, 44a of their respective side walls 42, 44. The intermediate drum portion 46 as inner and outer surfaces 46a, 46b, respectively and a slot 48 through which the end of 50 of the spring 24 passes. The end 52 of the tape 12 as an opening 54 therein for receiving the end 50 of the spring 24 and connecting the end 52 of the tape to the end 50 of the spring. The tape 12 is coiled around the outside surface 46b and the spring is coiled inside the inside surface 46a of the intermediate drum portion 46. It should be understood that there are a wide variety of constructions and designs for connecting the tape 12 and the spring 24.

The housing 21 has a housing cover 56 positioned opposite the tape housing member 22. The housing cover 56 has an inner surface 58 and outer surface 60. The coiling drum 40 has guides 62 on the outer surfaces 42b, 44b of the opposing side walls 42, 44 respectively. The guides 62 contact the inner surface 58 of the housing cover 56 and the inner surface 64 of the tape housing member 22 as the coiling drum 40 rotates about the axis 25 as will hereinafter be more fully described.

Figure 6:
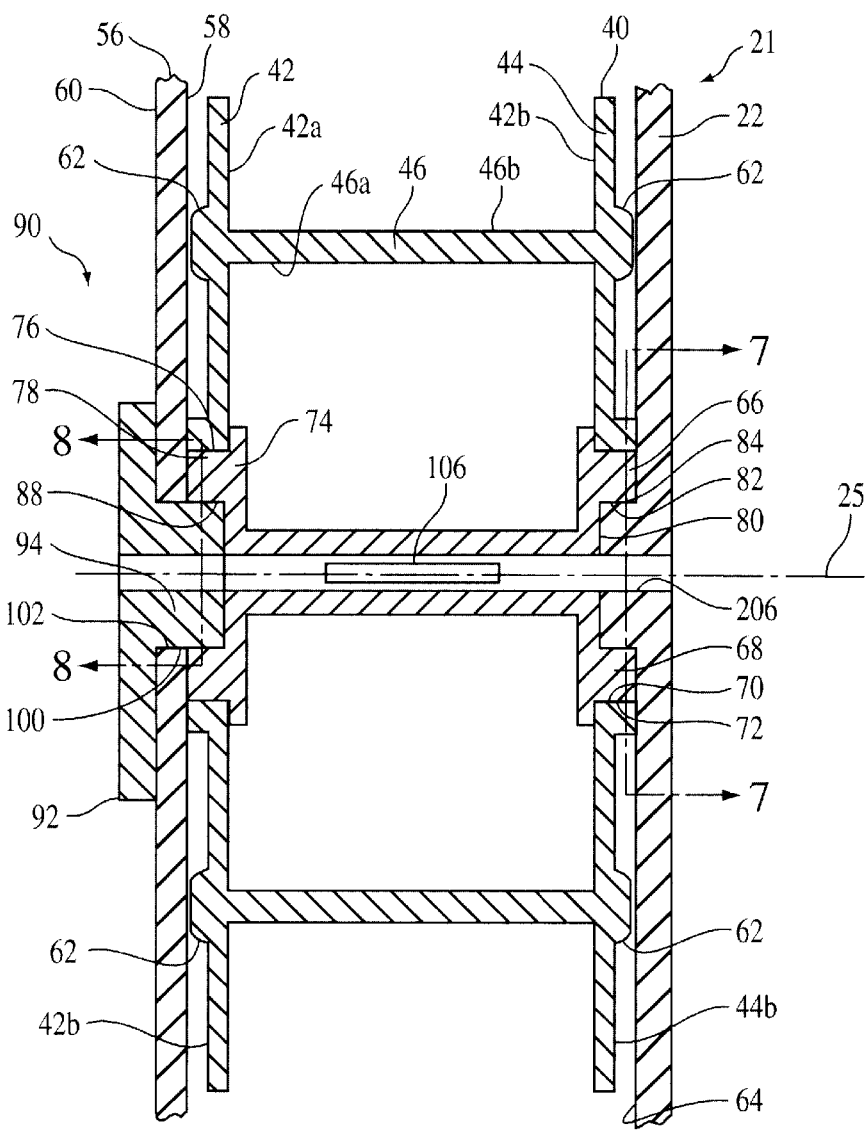
FIG. 6 is an expanded partial sectional view of a portion of the marking device shown in FIG. 1 and taken along lines 6—6 thereof.
Figure 7:
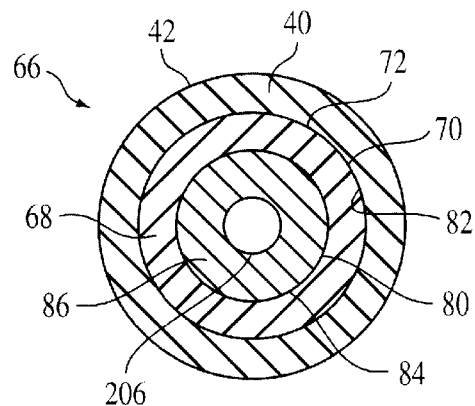
FIG. 7 is a partial sectional view of a portion of the marking device shown in FIG. 6 and taken along lines 7—7 thereof.
Figure 8:
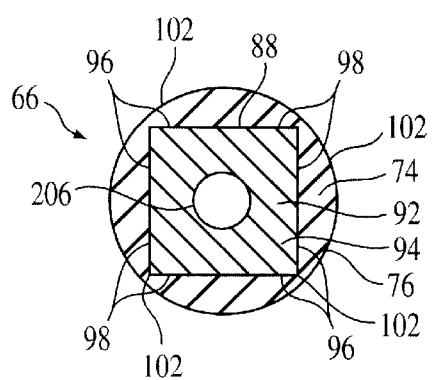
FIG. 8 is a partial sectional view of a portion of the marking device shown in FIG. 6 and taken along lines 8—8 thereof.

As seen in FIGS. 6–8, the coiling drum 40 is rotatably mounted to the housing members 22, 56 by the spindle 66. The end 68 of the spindle 66 has an outer peripheral cylindrical surface 70 for rotatable receiving the inner cylindrical surface 72 of the side wall 44 of the coiling drum 40. The cylindrical surfaces 70 and 72 have the same rotational axis 25 when the spindle 66 and coiling drum 40 are mounted to the housing 21. The other end 74 of the spindle 66 has an outer peripheral cylindrical surface 76 for rotatable receiving the inner cylindrical surface 78 of the side wall 42 of the coiling drum 40. The cylindrical surfaces 76 and 78 have the same rotational axis 25 when mounted to the housing 21. Accordingly, the coiling drum 40 is rotatably mounted to the spindle 66 about the axis 25.

To rotatably mount the coiling drum 40 to the housing members 22, 56, the spindle 66 is rotatable mounted to the housing members. The end 68 of the spindle 66 has a recess 80 therein having a cylindrical inner bearing surface 82 received by the outer cylindrical bearing surface 84 of the bearing portion 86 of the housing member 22.

The other end 74 of the spindle 66 has drive socket 88 for providing a biasing force to the marking device 10 of the present invention. The marking device 10 includes a biasing device 90 which includes a biasing arm 92, as seen in FIGS. 1, 6, and 8. The biasing arm 92 has a drive pin 94 which has a square cross section defined by four equal drive surfaces 96. The drive socket 88 of the spindle 66 has complementary drive surfaces 98 for receiving the drive surfaces 96 of the drive pin 94 therein. Accordingly, when the spindle 66 rotates, the biasing arm 92 rotates in a similar manner and the spring 24 exerts a biasing force on the biasing arm 92. It should be understood that it is within the contemplation of this invention to provide other driving connections between the spindle 66 and the biasing arm 92 to transfer a biasing force from the spring 24 to the biasing arm 92.

To rotatably mount the coiling drum 40 to the housing member 56, the spindle 66 is rotatable mounted to the housing member 56. The housing member 56 has an aperture 100 therethrough for receiving the drive socket 88 of the spindle 66 therein. The edges 102 of the drive socket 88 contact the aperture 100 so that the spindle 66 and consequently the coiling drum 40 rotates about the axis 25.

The biasing device 90 also includes the spring 24 for exerting a biasing force on the biasing arm 92 and a torque on the biasing arm to urge the marker holder towards the retracted position. The spring 24 has its one end 50 attached to the tape 12 as described above. The other end 104 of the spring 24 is secured to the spindle 66 by receiving the other end 104 in a slot 106 in the spindle 66. When the tape 12 is in the coiled position 14, the spring 24 is loosely coiled around the spindle 66 and exerts some biasing force on the biasing arm 92. As the tape 12 is extended from its coiled position 14, to an extended position 16, the spring 24 is tightened as the tape 12 is extended. Since counter rotation of the spring 24 is stopped only by the biasing arm 92, the biasing force is continually exerted on biasing arm while the measuring tape is free to be extended.

Marking device 10 of the present invention includes a marker housing member 108, an actuation member 110 and a marker holder 112 having a marker 114 attached thereto as seen in FIGS. 1–5. The housing 108 has an outer peripheral surface 116, defined in part by top, side, and bottom peripheral surfaces 118, 120, and 122, respectively. The top surface 118 of the outer peripheral surface 116 has an actuation aperture 124 through which the exterior portion 126 of the actuation member 110 extends. The bottom peripheral surface 122 of the outer peripheral surface 116 has a marking aperture 128 which is alignment with the outer edge 36 of the measuring tape opening or aperture 34 of the housing member 22 described above so that when the marker 114 is moved into its marking position, the mark made thereby is in alignment with the outer edge 36.

The actuation member 110, marker holder 112 and the arm 92 are mounted between the outer surface 130 of the housing cover 56 and the inner surface 132 of the side 134 of the marker housing member 108. The outer surface 130 of housing cover 56 is flat so that the actuation member 110, marker holder 112 and the arm 92 can bear against the surface 130 and slide with respect thereto during movement between a retracted position 136 (shown in FIG. 2) and the marking position 138 (shown in FIG. 4). The actuation member 110, marker holder 112 and the biasing arm 92 have flat inner surfaces 110a, 112a, and 92a and flat outer surfaces 110b, 112b, and 92b respectively. The thicknesses of the actuation member 110, marker holder 112 and the arm 92, the distance between the inner and outer surfaces 110a–110b; 112a–112b; and 92a–92b, are substantially equal and when the the marker housing member 108 is assembled with the housing member 56 the inner surfaces 110a, 112a, 92a are in contact with the outer surface 130 of the housing cover 56 and the outer surfaces 110b, 112b, 92b are in contact with the inner surface 132 of the marker housing member 108.

The actuation member 110 is provided for moving the marker 114 from the retracted position 136 to the marking position 138 and includes exterior portion 126 extending through the actuation aperture 124 and outwardly therefrom. The actuation member 110 is movably mounted in the housing 108 in a slot 140 and is movable between a retracted position 136 and the marking position 138. The slot 140 has a shoulder 142 which cooperates with a shoulder 144 on the actuation member 110 so that the actuation member is retained in the slot 140 and cannot be pulled out of the slot. The actuation member has front and rear sides 145, 146 respectively that are received in the slot 140 to allow vertical movement of the actuation member 110 with respect to the housing 108.

The actuation member 110 is retained in the slot or actuation member guide 140 as it is moved between the retracted and marking positions 136,138 respectively. The actuation member 110 has a guide slot 148 for receiving a pin 150 secured to and extending from the inner surface 132 of the side 134 of the marker housing member 108 for guiding and limiting the movement of the actuation member between the retracted and the marking positions. The guide slot 148 extends in the direction of movement of the actuation member 110. The actuation member 110 has a bearing surface 152 for contact with the upper bearing surface 154 of the driving arm 156 of the marker holder 112. Accordingly, the actuation member 110 is drivingly connected to the marker holder. When the actuation member 110 is moved from the retracted position 136, shown in FIG. 2, to the marking position 138, shown in FIG. 4, its bearing surface 152 exerts a force on the upper bearing surface 154 of the marker holder 112 to move the marker holder to the marking position.

The biasing arm 92 has a bearing surface 158 in contact with the lower bearing surface 160 of the driving arm 156 of the marker holder 112. Accordingly, the biasing arm 92 is connected to the marker holder 112. As described above, the biasing arm 92 has a force exerted thereon by the spring 24 which biasing force constantly urges the driving arm 156 of the marker holder 112 to the retracted position 136. It should be understood that it is within the contemplation of this invention to provide a biasing force on the biasing arm with a separate spring other than the spring 24.

It is contemplated that a marker 10 of the present invention could be provided as a separate device that is secured to an existing tape measure. In such a design, the surface 130 would be provided by a separate marker housing member that would be attachable to a known tape measure so that the marker tip 174 in the marking position is in alignment with the outer edge 36 of the measuring tape opening or aperture 34 of the housing member 22 described above. When the marker 114 is moved into its marking position, the mark made thereby is in alignment with the outer edge 36. In such a design, the biasing arm is rotatably mounted to the marker housing and a separate spring, such as a helical spring or coil spring is provided and has one end attached to the marker housing and the other end attached to the biasing arm in a manner that provides a biasing force on the biasing arm so that the marker holder is constantly resiliently urged toward the retracted position.

As seen in FIGS. 1–5, a marker holder guide device 162 is provided for guiding the marker holder 112 between the retracted and marking positions 136, 138. The guide device 162 includes upper and lower guide slots 164, 166 in the inner surface 132 of the side 134 of the marker housing member 108. The guide device 162 includes upper and lower pins 168, 170 extending from the outer surface 112b of the marker holder 112. The upper pin 168 is received in the upper guide slot 162 and the lower pin 170 is received in the lower guide slot 166.

Figure 2:
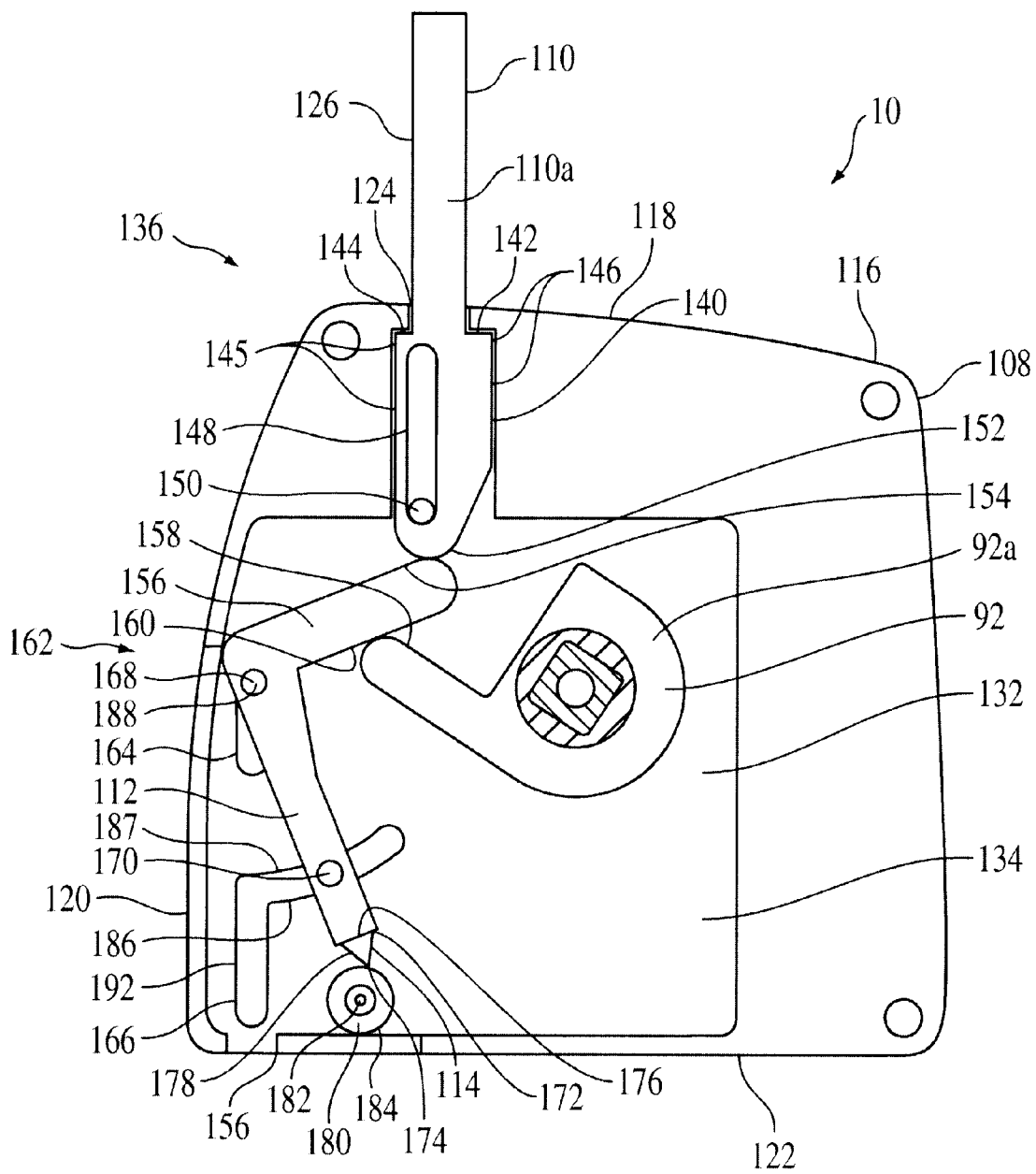
FIG. 2 is a sectional side view of the marking device shown in FIG. 1 with the components assembled and in a retracted position and taken along lines 2—2 thereof.

In the retracted position 136 shown in FIG. 2, the marker 114 is secured to the marker end 172 of the marker holder 112. The marker 114 has a pointed or chiseled end or tip 174 and a base portion 176 which is connected to the pointed end by side surfaces 178. An inker 180 is provided and is rotatably mounted to the marker housing member 108 by means of the pin 182. The pin 182 is attached to the marker housing member 108 and extends from its inner surface 132 towards the housing cover 56. The inker 180 has a cylindrical outer surface 184 and is positioned so that the marker 114 is adjacent the inker 180 when in the retracted position 136. The inker 180 is positioned rearward of the marking aperture 128. It should be understood that the side surface 178 or the pointed end 174 of the marker is adjacent to and may be in contact with the outer surface 184 of the inker when in the retracted position. The inker 180 is made from a known material that absorbs and stores ink so that when the marker 114 contacts the inker 180, it receives a supply of ink for making a mark when the marker is moved to the marking position 138.

The upper guide slot 164 is substantially straight and is positioned above and in alignment with the marking aperture 128 . The upper guide slot 164 is positioned along a line substantially perpendicular to the bottom surface 122 of the marker housing 108. The upper portion 186 of the lower guide slot 166 receives the lower pin 170 therein and is positioned with respect to the inker 180 so that in the retracted position the marker 114 is adjacent the inker 180 and as the marker is moved from the retracted position to the marking position, it moves across in contact with the inker said that ink is deposited on the marker. Generally the upper portion 186 of the guide slot 166 has an arcuate shape formed in an arc 187 having a center being substantially the center 188 of the upper pin 168 when in the retracted position 136. When the marker 114 moves in that arc, the tip 174 moves across the inker 180. The upper slot 164 has a top end 189 that the upper pin 168 bears against during movement from the retracted position to assure the marker 114 contacts the inker 180.

Figure 5:
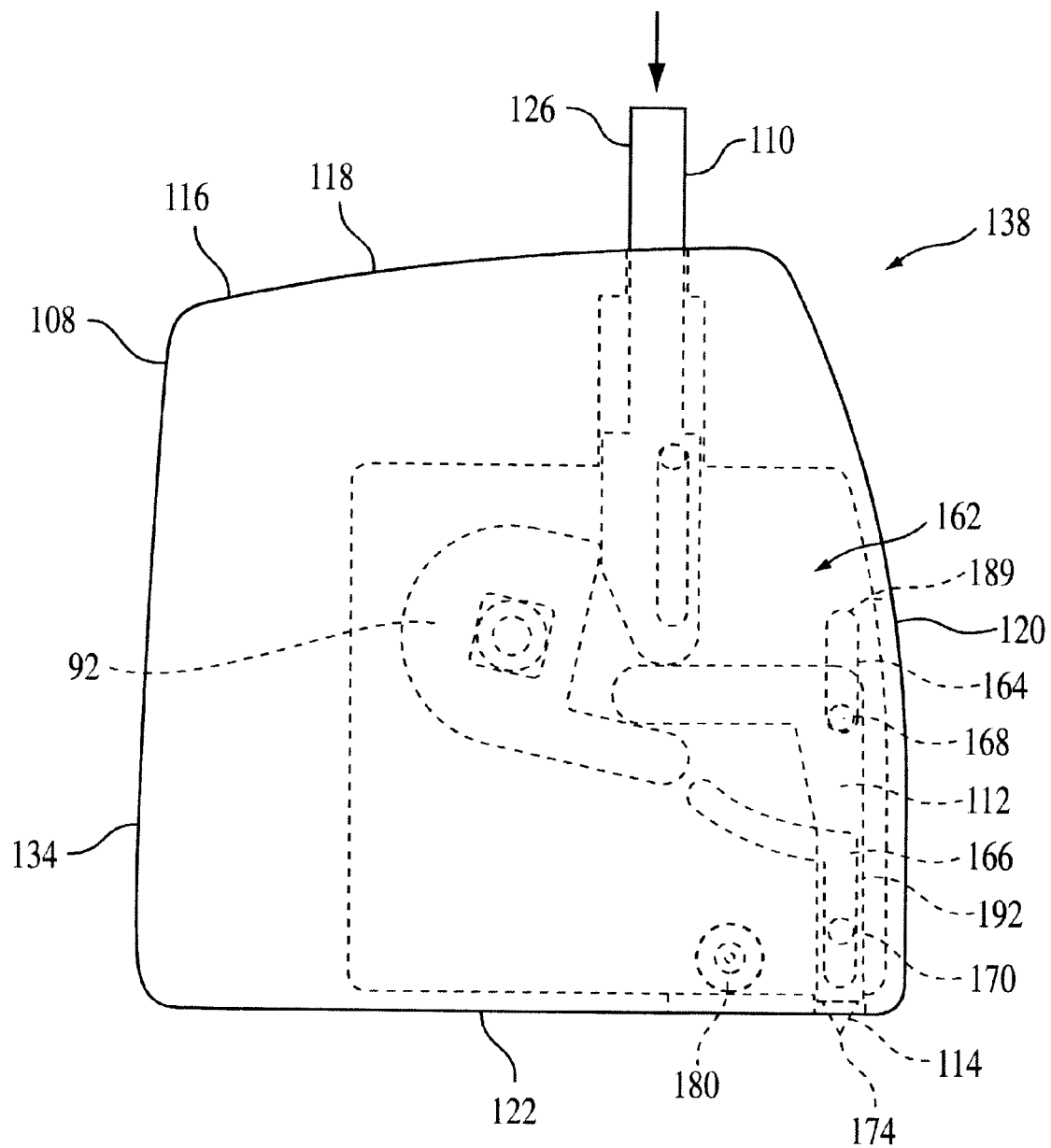
FIG. 5 is an end view of the marking device shown in FIG. 1 with the components assembled.

It should be noted that FIG. 5 is a end view of the marking device of the present invention showing the outside of the marker housing member 108 with the components of the marker device 10 shown in dashed lines to more readily see the configuration of the upper and lower slots 164, 166 and their co-action with the upper and lower pins 168, 170 respectively.

As shown in FIGS. 1–5, when the actuation member 110 is depressed, sufficient force is exerted to overcome the biasing force exerted by the biasing member 92 and the marker holder 112 and consequently the marker 114 moves across the inker 180 in an arc 187 and picks up ink from the inker. During this arcuate movement the upper pin 168 remains substantially stationary and bears against the top end 189 of the upper slot 164 while the marker holder 112 moves in a generally arcuate direction about the upper pin until it reaches the intermediate position 190 shown in FIG. 3.

Figure 3:
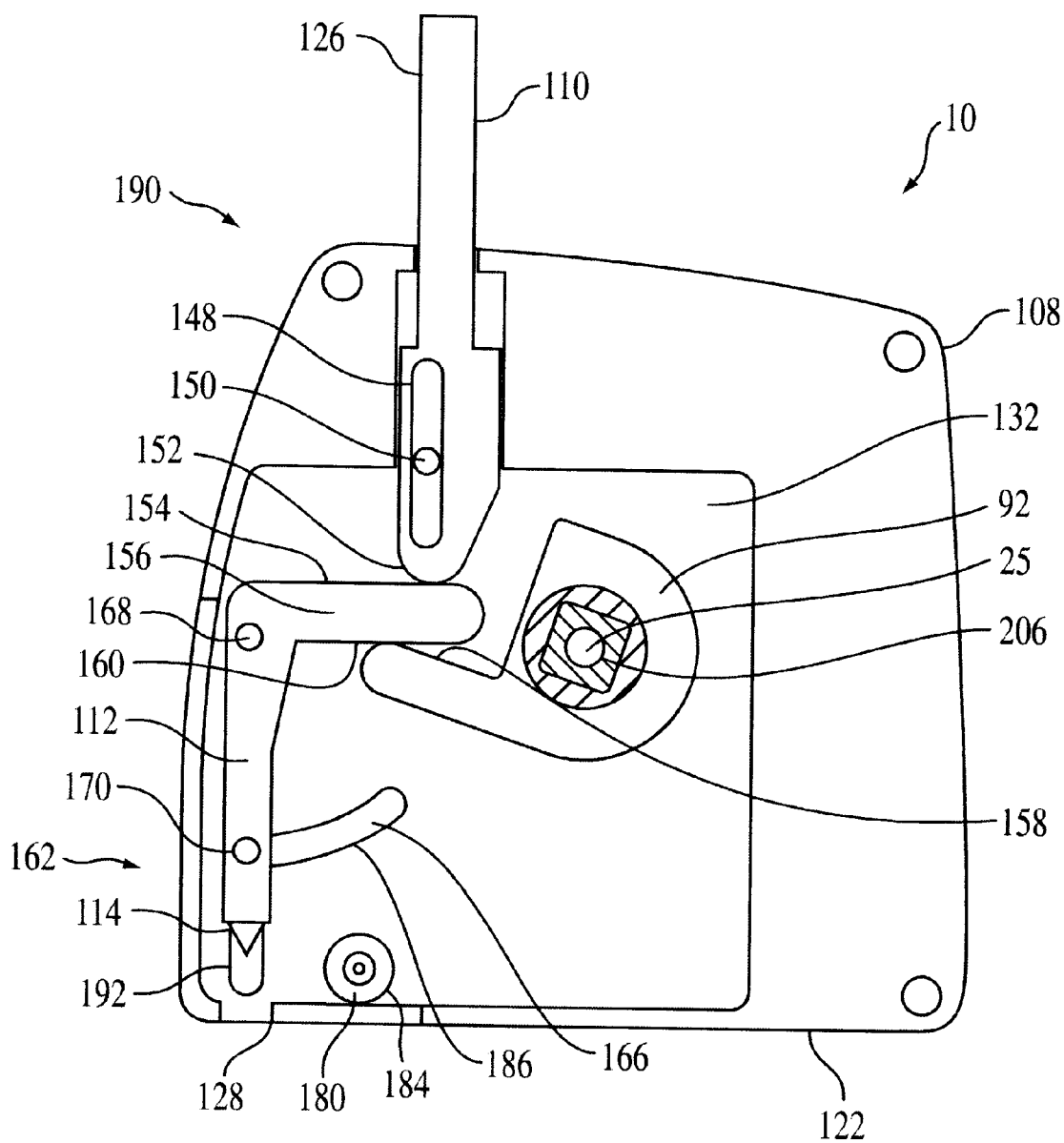
FIG. 3 is a sectional view of the marking device shown in FIG. 2 with the components assembled and moved to an intermediate position and toward a marking position.
Figure 4:
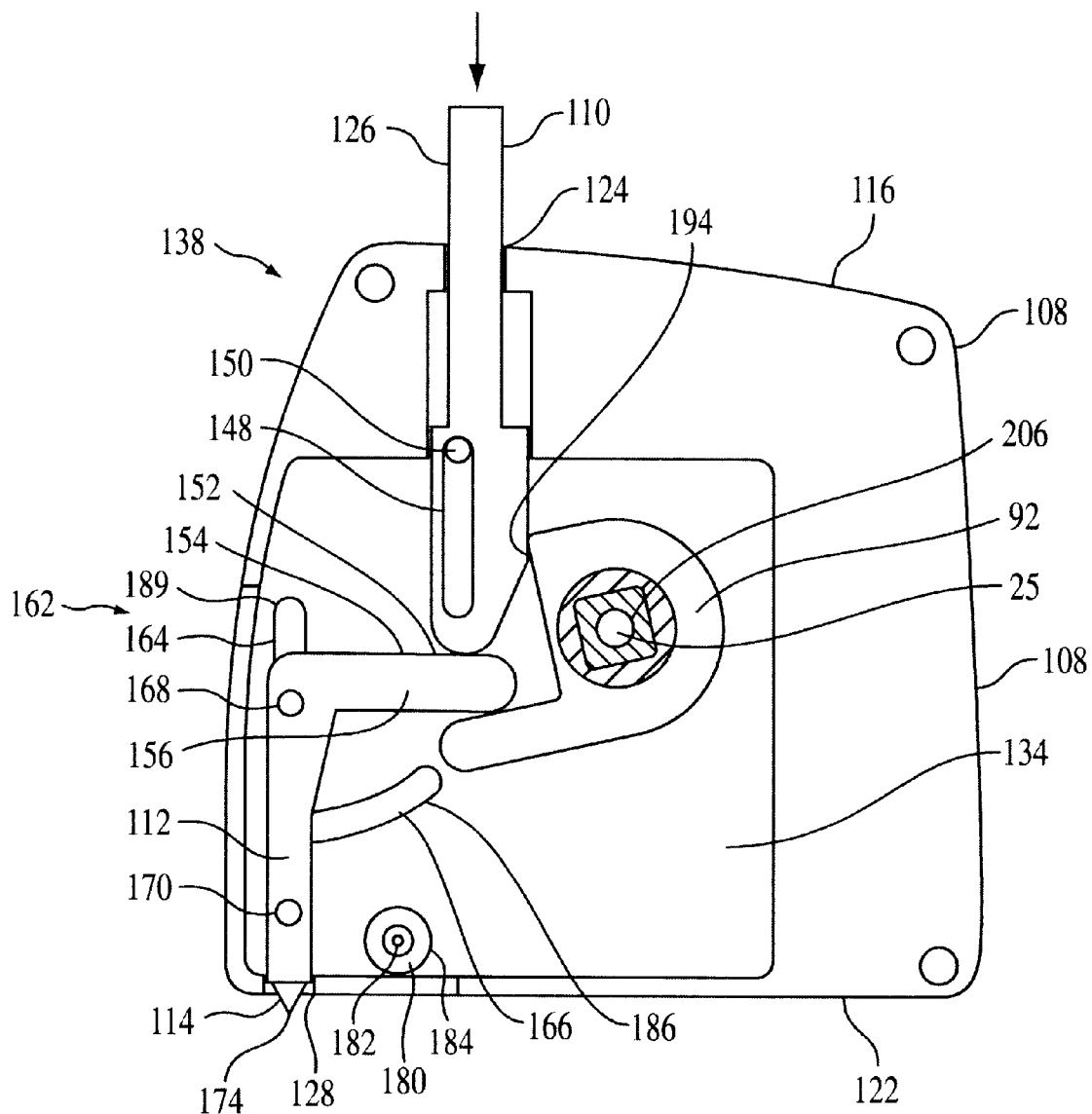
FIG. 4 is a sectional view of the marking device shown in FIG. 2 with the components assembled and in a marking position.

When moving from the intermediate position 190 shown in FIG. 3 to the marking position shown in FIG. 4, the marker holder 112 and consequently the marker 114 move in a direction substantially perpendicular to the bottom surface 122 of the marker housing 108. To accomplish this direction of movement, the lower portion 192 of the lower guide slot 166 positioned above and in alignment with the marking aperture 128. The upper portion 186 of the lower guide slot 166 is at an angle to the lower portion 192 and in a direction toward the inker 180. The lower portion 192 of the lower guide slot 166 is also in a direction substantially perpendicular to the bottom surface 122 of the marker housing 108. Accordingly, when the pins 168, 170 are in the upper guide slot 164 and the lower portion 192 of the lower guide slot 166, the marker 114 moves in a substantially vertical direction through the marker aperture 128 and into contact with a workpiece positioned adjacent to the marker aperture as shown in FIG. 4. It should be understood that this movement from the retracted position 136 to the marking position 138 is created by a force exerted on the actuator 110 to move the marker as described above.

In the marking position, the marking point 174 of the marker 14 is in alignment with the edge 36 of the measuring tape aperture or opening 34. When the operator of the marking device 10 sees the desired measuring mark on the tape 12 in alignment with the edge 36 and depresses the actuation member 110, a mark is made on a workpiece in alignment with the desired measuring mark. The slots 164, 166 and their cooperating pins 168, 170 are positioned to provide this alignment.

In the marking position 138 shown in FIG. 4 the marking point or tip 174 of the marker 114 extends through the marker aperture 128 to mark a workpiece. The amount of the downward movement of the marker 114 is limited by contact of the stop surface 194 of the biasing arm 92 against the rear side 146 of the actuation member 110. By prohibiting further downward movement of the actuation member 110 with the marker member 112 retained between the biasing arm 92 and the actuation member 110 the marking device 10 remains in assembled condition in the marking position.

When the marking force is no longer exerted on the actuation member 110, the biasing arm 92 exerts an upward force on the marking member 112 and consequently the actuation member 110. This biasing force moves the marker member in a generally vertical direction towards the intermediate position 190, shown in FIG. 3, with the marker 114 retracting out of the marking position. The biasing force exerted by the biasing arm 92 is exerted through its bearing surface 158 to the lower bearing surface 160 of the driving arm 156 of the marker member. Since these bearing surfaces are positioned away from the upper pin 168, a torque is created around the upper pin 168 to rotate the marker arm back to the retracted position 136 as shown in FIG. 2.

The marker 10 is assembled to the tape housing by threaded fasteners 196 extending through outer apertures 198, 200 in the housing members 22 and 56 respectively. The central apertures 202, 100 in the housing members 22 and 56 respectively, are in alignment with a central aperture 206 in the spindle 66. A threaded fastener 196 is positioned through the apertures 202, 100 and 204 so that the coiling drum 40 rotates about the axis 25. The marker housing 108 has threaded apertures 208 for threadedly engaging the fasteners 196 and securing the housing members 22, 56, and 108 together to provide a tape measure with a marking device 10 of the present invention.

The invention has been described with reference to the preferred embodiment. Obviously, modifications and alterations will occur to others upon reading and understanding this specification. It is our intention to include all modifications and alterations insofar as they come within the scope of the appended claims or equivalents thereof.

Having described our invention, we claim:

1. A marking device for use with a measuring tape to mark a desired distance measured by the tape comprising:
   a) a housing, said housing having an outer surface having an actuation aperture and a marking aperture,
   b) an actuation member having a exterior portion extending through said actuation aperture and outwardly therefrom, said actuation member movably mounted to said housing and movable between a retracted position and a marking position,
   c) a marker holder movably mounted to said housing and movable between a retracted position and a marking position for marking the desired distance, said actuation member connected to said marker holder for moving said marker holder from said retracted position to said marking position upon activation of said actuation member,
   d) a marker attached to said marker holder, said marker extending through said marking aperture when said marker holder is in said marking position to mark the desired distance measured by the tape,
   e) an inker directly fixed to said housing and adjacent said marker when said marker holder is in said retracted position for providing ink to said marker when moved from said retracted position to said marking position,
   f) a marker holder guide which positions said marker adjacent said inker in said retracted position and guides movement of said marker from said retracted position, and across said inker when said marker holder guide is moved from said retracted to said marking position upon actuation of said actuation member, and
   g) a biasing device including a biasing arm rotatably mounted to said housing and a spring connected to said biasing arm for exerting a biasing force thereon, said biasing arm connected to said marker holder to urge said marker toward said retracted position.

2. A marking device for a measuring tape to mark a desired distance measured by the tape as described in claim 1 in which said marker holder guide includes an upper and a lower slot in said housing and an upper and a lower pin in said marker holder guide, said upper pin received by said upper slot and said lower pin received by said lower slot for guiding said marker holder upon movement of said marker holder between said retracted position and said marking position.

3. A marking device for a measuring tape to mark a desired distance measured by the tape as described in claim 2 in which said upper slot is substantially straight and in alignment with said marking aperture.

4. A marking device for a measuring tape to mark a desired distance measured by the tape as described in claim 1 which includes at least one slot in one of said housing and said actuation member and at least one pin in the other of said housing and said actuation member, said one pin received by said one slot.

5. A marking device for a measuring tape to mark a desired distance measured by the tape as described in claim 1 wherein said spring has one end connected to said biasing arm and another end adapted for connection to the tape to urge the tape to a coiled position while allowing movement of the tape to an extended position.

6. A marking device for a measuring tape to mark a desired distance measured by the tape as described in claim 1 which includes an actuation member guide to guide said actuation member upon movement of said actuation member between said retracted position and said marking position.

7. A marking device for use with a measuring tape extendible from a coiled position to mark a desired distance measured by the tape comprising:
   a) a housing, said housing having an outer surface having an actuation aperture and a marking aperture,
   b) an actuation member having a exterior portion extending through said actuation aperture and outwardly therefrom, said actuation member movably mounted to said housing and movable between a retracted position and a marking position,
   c) a marker holder movably mounted to said housing and movable between a retracted position and a marking position for marking the desired distance, said actuation member connected to said marker holder for moving said marker holder from said retracted position to said marking position upon activation of said actuation member,
   d) a marker attached to said marker holder, said marker extending through said marking aperture when said marker holder is in said marking position to mark the desired distance measured by the tape,
   e) a marker holder guide to guide said marker holder upon movement of said marker holder between said retracted position and said marking position, and
   g) a biasing device connected to one of said actuation member and said marker holder to urge said marker holder toward said retracted position with a biasing force and to move said actuation member and said marker holder to said retracted position upon deactivation of said actuation member, said biasing device having a spring for providing the biasing force and adapted for connection to the tape to urge the tape to the coiled position while allowing extension of the tape from its coiled position.

8. A marking device for a measuring tape extendible from a coiled position to mark a desired distance measured by the tape as described in claim 7 wherein said biasing device includes a biasing arm connected to said spring, said biasing arm connected to said one of said marker holder and said actuation member to urge said marker toward said retracted position.

9. A marking device for a measuring tape extendible from a coiled position to mark a desired distance measured by the tape as described in claim 7 in which said spring is wound around a rotational axis and adapted to urge the tape to the coiled position around the same rotational axis.

10. A marking device for a measuring tape extendible from a coiled position to mark a desired distance measured by the tape as described in claim 7 which includes a actuation member guide to guide said actuation member upon movement of said actuation member between said retracted position and said marking position.

11. A marking device for a measuring tape extendible from a coiled position to mark a desired distance measured by the tape as described in claim 7 wherein said marking device includes an inker mounted in said housing and adjacent said marker when said marker holder is in said retracted position and for providing ink to said marker when said marker is moved from said retracted position to said marking position.

12. A marking device for a measuring tape extendible from a coiled position to mark a desired distance measured by the tape as described in claim 11 wherein said marker holder guide positions said marker adjacent said inker in said retracted position and across said inker when said marker holder guide is moved from said retracted to said marking position.

13. A marking device for a measuring tape extendible from a coiled position to mark a desired distance measured by the tape as described in claim 7 which said marker holder guide includes at least one slot in one of said housing and said marker holder and at least one pin in the other of said housing and said marker holder guide, said one pin received by said one slot for guiding said marker holder upon movement of said marker holder between said retracted position and said marking position.

14. A marking device for a measuring tape to mark a desired distance measured by the tape as described in claim 7 in which said marker holder guide includes an upper and a lower slot in said housing and an upper and a lower pin in said marker holder guide, said upper pin received by said upper slot and said lower pin received by said lower slot for guiding said marker holder upon movement of said marker holder between said retracted position and said marking position.

15. A marking device for a measuring tape to mark a desired distance measured by the tape as described in claim 14 in which said upper slot is substantially straight and in alignment with said marking aperture.

16. A marking device for a measuring tape to mark a desired distance measured by the tape as described in claim 7 which includes at least one slot in one of said housing and said actuation member and at least one pin in the other of said housing and said actuation member, said one pin received by said one slot.

17. A marking device for use with a measuring tape to mark a desired distance measured by the tape comprising:
  a) a housing, said housing having an outer surface having an actuation aperture, marking aperture and a tape aperture,
  b) a flexible tape having measuring marks thereon, said tape is rotatably mounted in said housing and extendible from a coiled position to mark a desired distance measured by the tape and having one end of said tape extendable from said tape aperture of said housing,
  c) an actuation member having a exterior portion extending through said actuation aperture and outwardly therefrom, said actuation member movably mounted to said housing and movable between a retracted position and a marking position,
  d) a marker holder movably mounted to said housing and movable between a retracted position and a marking position for marking the desired distance, said actuation member connected to said marker holder for moving said marker holder from said retracted position to said marking position upon activation of said actuation member,
  e) a marker attached to said marker holder, said marker extending through said marking aperture when said marker holder is in said marking position to mark the desired distance measured by the tape,
  f) an inker directly fixed to said housing and adjacent said marker when said marker holder is in said retracted position for providing ink to said marker when moved from said retracted position to said marking position,
  g) a marker holder guide which positions said marker adjacent said inker in said retracted position and guides movement of said marker from said retracted position, and across said inker when said marker holder guide is moved from said retracted to said marking upon actuation of said actuation member, and
  h) a biasing device including a biasing arm rotatably mounted to said housing and a spring connected to said biasing arm for exerting a biasing force thereon, said biasing arm connected to said marker holder to urge said marker toward said retracted position, said spring connected to said tape to urge the tape to said coiled position while allowing movement of the tape to an extended position.

18. A marking device for a measuring tape to mark a desired distance measured by the tape as described in claim 17 in which said marker holder guide includes an upper and a lower slot in said housing and an upper and a lower pin in said marker holder guide, said upper pin received by said upper slot and said lower pin received by said lower slot for guiding said marker holder upon movement of said marker holder between said retracted position and said marking position.

19. A marking device for a measuring tape to mark a desired distance measured by the tape as described in claim 18 in which said upper slot is substantially straight and in alignment with said marking aperture.

20. A marking device for a measuring tape to mark a desired distance measured by the tape as described in claim 17 which includes at least one slot in one of said housing and said actuation member and at least one pin in the other of said housing and said actuation member, said one pin received by said one slot.

21. A marking device for a measuring tape to mark a desired distance measured by the tape as described in claim 17 in which said spring and said tape are wound around the same rotational axis.

22. A marking device for a measuring tape to mark a desired distance measured by the tape as described in claim 17 which includes an actuation member guide to guide said actuation member upon movement of said actuation member between said retracted position and said marking position.

23. A marking device for a measuring tape to mark a desired distance measured by the tape as described in claim 17 in which said tape aperture having an outer edge, said marker when in the marking position is in alignment with said outer edge of said tape aperture.

24. A marking device for a measuring tape to mark a desired distance measured by the tape comprising:
  a) a housing, said housing having an outer surface having an actuation aperture and a marking aperture,
  b) an actuation member having a exterior portion extending through said actuation aperture and outwardly therefrom, said actuation member movably mounted to said housing and movable between a retracted position and a marking position,
  c) a marker holder movably mounted to said housing and movable between a retracted position and a marking position for marking the desired distance, said actuation member connected to said marker holder for moving said marker holder from said retracted position to said marking position upon activation of said actuation member, d) a marker attached to said marker holder, said marker extending through said marking aperture when said marker holder is in said marking position to mark the desired distance measured by the tape, e) an inker mounted in said housing and adjacent said marker when said marker holder is in said retracted position for providing ink to said marker when moved from said retracted position to said marking position, f) a marker holder guide which positions said marker adjacent said inker in said retracted position and guides movement of said marker from said retracted position, and across said inker when said marker holder guide is moved from said retracted to said marking upon actuation of said actuation member, said marker holder guide includes an upper and a lower slot in said housing and an upper and a lower pin in said marker holder guide, said upper pin received by said upper slot and said lower pin received by said lower slot for guiding said marker holder upon movement of said marker holder between said retracted position and said marking position, said lower slot has an upper and a lower portion, said lower portion is substantially straight and in alignment with said marking aperture and said upper portion is at an angle to said lower portion and in a direction toward said inker and g) a biasing device including a biasing arm rotatably mounted to said housing and a spring connected to said biasing arm for exerting a biasing force thereon, said biasing arm connected to said marker holder to urge said marker toward said retracted position.

25. A marking device for a measuring tape to mark a desired distance measured by the tape comprising:

a) a housing, said housing having an outer surface having an actuation aperture and a marking aperture, b) an actuation member having a exterior portion extending through said actuation aperture and outwardly therefrom, said actuation member movably mounted to said housing and movable between a retracted position and a marking position, c) a marker holder movably mounted to said housing and movable between a retracted position and a marking position for marking the desired distance, said actuation member connected to said marker holder for moving said marker holder from said retracted position to said marking position upon activation of said actuation member, d) a marker attached to said marker holder, said marker extending through said marking aperture when said marker holder is in said marking position to mark the desired distance measured by the tape, e) an inker mounted in said housing and adjacent said marker when said marker holder is in said retracted position for providing ink to said marker when moved from said retracted position to said marking position, f) a marker holder guide which positions said marker adjacent said inker in said retracted position and guides movement of said marker from said retracted position, and across said inker when said marker holder guide is moved from said retracted to said marking upon actuation of said actuation member, and g) a biasing device including a biasing arm rotatably mounted to said housing and a spring connected to said biasing arm for exerting a biasing force thereon, said biasing arm connected to said marker holder to urge said marker toward said retracted position, said spring has one end connected to said biasing arm and another end adapted for connection to the tape to urge the tape to a coiled position while allowing movement of the tape to an extended position, said spring is wound around a rotational axis and the tape being wound around the same rotational axis.

26. A marking device for a measuring tape to mark a desired distance measured by the tape comprising:

a) a housing, said housing having an outer surface having an actuation aperture and a marking aperture, b) an actuation member having a exterior portion extending through said actuation aperture and outwardly therefrom, said actuation member movably mounted to said housing and movable between a retracted position and a marking position, c) a marker holder movably mounted to said housing and movable between a retracted position and a marking position for marking the desired distance, said actuation member connected to said marker holder for moving said marker holder from said retracted position to said marking position upon activation of said actuation member, d) a marker attached to said marker holder, said marker extending through said marking aperture when said marker holder is in said marking position to mark the desired distance measured by the tape, e) a marker holder guide to guide said marker holder upon movement of said marker holder between said retracted position and said marking position, said marker holder guide includes an upper and a lower slot in said housing and an upper and a lower pin in said marker holder guide, said upper pin received by said upper slot and said lower pin received by said lower slot for guiding said marker holder upon movement of said marker holder between said retracted position and said marking position, g) a biasing device connected to one of said actuation member and said marker holder to urge said marker holder toward said retracted position with a biasing force and to move said actuation member and said marker holder to said retracted position upon deactivation of said actuation member, said biasing device having a spring for providing the biasing force and adapted for connection to the tape to urge the tape to the coiled position while allowing extension of the tape from its coiled position, and an inker secured to said housing, said lower slot has an upper and a lower portion, said lower portion is substantially straight and in alignment with said marking aperture and said upper portion is at an angle to said lower portion and in a direction toward said inker.

27. A marking device for a measuring tape to mark a desired distance measured by the tape comprising:

a) a housing, said housing having an outer surface having an actuation aperture, marking aperture and a tape aperture, b) a flexible tape having measuring marks thereon, said tape is rotatably mounted in said housing and extendible from a coiled position to mark a desired distance measured by the tape and having one end of said tape extendable from said tape aperture of said housing, c) an actuation member having a exterior portion extending through said actuation aperture and outwardly therefrom, said actuation member movably mounted to said housing and movable between a retracted position and a marking position, d) a marker holder movably mounted to said housing and movable between a retracted position and a marking position for marking the desired distance, said actuation member connected to said marker holder for moving said marker holder from said retracted position to said marking position upon activation of said actuation member, e) a marker attached to said marker holder, said marker extending through said marking aperture when said marker holder is in said marking position to mark the desired distance measured by the tape, f) an inker mounted in said housing and adjacent said marker when said marker holder is in said retracted position for providing ink to said marker when moved from said retracted position to said marking position, g) a marker holder guide which positions said marker adjacent said inker in said retracted position and guides movement of said marker from said retracted position, and across said inker when said marker holder guide is moved from said retracted to said marking upon actuation of said actuation member, said marker holder guide includes an upper and a lower slot in said housing and an upper and a lower pin in said marker holder guide, said upper pin received by said upper slot and said lower pin received by said lower slot for guiding said marker holder upon movement of said marker holder between said retracted position and said marking position, said lower slot has an upper and a lower portion, said lower portion is substantially straight and in alignment with said marking aperture and said upper portion is at an angle to said lower portion and in a direction toward said inker, and h) a biasing device including a biasing arm rotatably mounted to said housing and a spring connected to said biasing arm for exerting a biasing force thereon, said biasing arm connected to said marker holder to urge said marker toward said retracted position, said spring connected to said tape to urge the tape to said coiled position while allowing movement of the tape to an extended position.

* * * * *